Jan. 3, 1939.   C. S. LAWTON   2,142,136
APPARATUS FOR DETERMINING DEPTH OF SUBMARINE CABLE
TRENCH DURING CABLE LAYING OPERATIONS
Filed Feb. 19, 1938   2 Sheets-Sheet 1
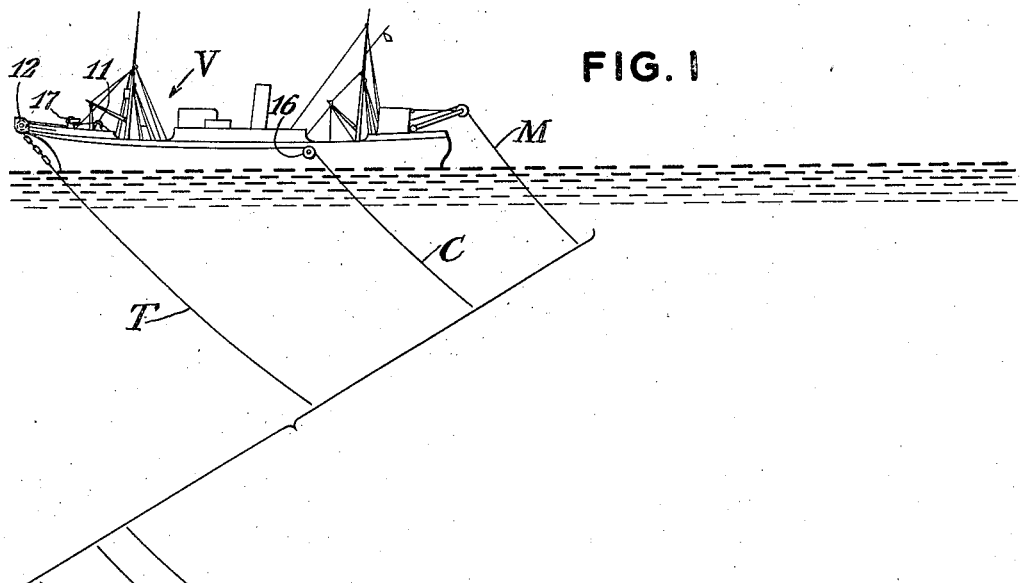
FIG. 1
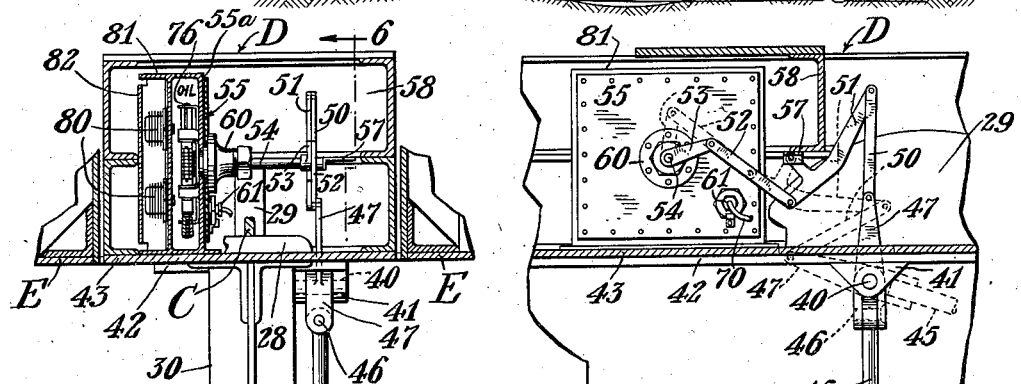
FIG. 5   FIG. 6
INVENTOR
C. S. LAWTON
BY
ATTORNEY Jan. 3, 1939.  C. S. LAWTON  2,142,136
APPARATUS FOR DETERMINING DEPTH OF SUBMARINE CABLE
TRENCH DURING CABLE LAYING OPERATIONS
Filed Feb. 19, 1938  2 Sheets-Sheet 2

INVENTOR
C. S. LAWTON
BY
ATTORNEY

Patented Jan. 3, 1939

2,142,136

UNITED STATES PATENT OFFICE 2,142,136

APPARATUS FOR DETERMINING DEPTH OF SUBMARINE CABLE TRENCH DURING CABLE LAYING OPERATIONS

Chester S. Lawton, Ridgewood, N. J., assignor to The Western Union Telegraph Company, New York, N. Y., a corporation of New York Application February 19, 1938, Serial No. 191,440

10 Claims. (Cl. 61—72)

This invention relates generally to submarine cable embedding apparatus, and more particularly to an improved system and means for obtaining an indication of the manner in which the apparatus is working during cable embedding operations.

When submarine cables are laid on the bed of the ocean or other body of water through which they pass, they are frequently fouled or dragged and sometimes are broken by otterboards of nets of deep sea fishing vessels or by ships' anchors, and in the U. S. Patent to C. S. Lawton, No. 2,099,527, issued November 16, 1937, there is disclosed a submarine cable plow adapted to be towed by a cable ship for forming under water a trench in the bed of the body of water in which the cable is to lie and simultaneously placing the cable therein to imbed the same and thus avoid fouling of, or injury to, the cable, the trench thus formed being caused to vary in depth in accordance with the ground resistance offered to the passage of the plow, or in accordance with the towing tension, the advantages of which are set forth in detail in the patent.

It is highly desirable to know on board ship whether the cable plow is forming a trench of proper depth in the bed of the body of water, and also when, due to adverse conditions, the plow share is no longer working in the bed, thereby to obtain an indication of whether the cable is being properly buried.

One of the objects of the invention is to provide an improved system and apparatus for obtaining an indication, on board ship or at some other distant point, of the manner in which a submarine cable embedding device is working during cable laying operations.

Another object is a system and apparatus of the character described which will indicate the depth of the trench being formed by the embedding device during cable laying operations.

The invention further resides in the features of combination, construction and arrangement hereinafter described and claimed.

For an understanding of the invention, and for illustration of one of the various forms it may take, reference is had to the accompanying drawings, in which:

Fig. 1 is a diagrammatic view of a cable ship and a submarine cable plow embodying signal transmitting apparatus in accordance with the invention, during cable laying operations;

Fig. 5 is a fragmentary view, partly in section, showing the details of the signal transmitting apparatus employed; and Fig. 6 is a sectional view taken along the line 6—6 of Fig. 5.

Figure 2:
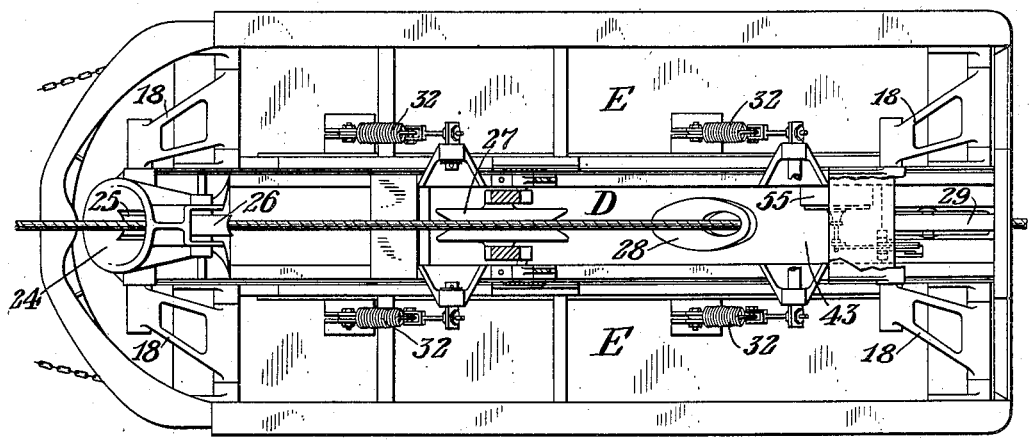
Fig. 2 is a plan view of the submarine cable plow and transmitting apparatus.

Referring to Fig. 1 of the drawings, there is shown a cable embedding device F for forming a cable trench X in the bed of the body of water in which the cable C is to be embedded and simultaneously placing the cable in the trench. As will be seen from the figure, the cable embedding device is towed by a cable ship or vessel V, by means of a towline T, both the cable and towline forming long curves in the water, the amount of sag in the cable and towline varying with the depth of the water in which the embedding device is working. By employing a towline of proper length, the sag in the line causes the latter to exert a pull on the cable embedding device in a direction substantially parallel to the bed on which the embedding device is traveling. Preferably, the degree of curvature in the cable C is maintained such that the cable is approximately tangent to the bed at or near the point where it enters the embedding device. The cable is payed out from a cable supply in the hold of the vessel V, and the tensile stress on the cable controlled, preferably in the manner disclosed in the U. S. patent to Lawton and Bloomer No. 2,067,717, issued January 12, 1937, the cable passing through a suitable brake device which controls the slack condition of the cable as it passes to the cable payout drum 11. The cable winds around the drum several times and then passes to a roller or sheave 12 on the bow of the ship, after which it is passed along the side of the ship a suitable distance, for example, two-thirds the length of the ship, to a roller or sheave 16 on the side of the cable ship, thereby to minimize the possibility of fouling of the cable C with the towline T. The cable also passes through a dynamometer device 17 which measures the tension on the cable as the latter is payed out. It will be understood that additional roller or sheaves, not shown, are provided for supporting and guiding the cable on board ship, and also that additional cable sheaves may be provided on the side of the ship, if desired.

The stress on the towline T may be measured and controlled by devices similar to that employed for controlling and measuring the stress on the cable C, and the length of the towline between the bow of the vessel and the cable embedding device F may be adjusted to varying depths of water and conditions of towing in the manner disclosed in the aforesaid Lawton and Bloomer patent.

The cable embedding device may be of the type disclosed in the Lawton and Bloomer patent, but preferably is in accordance with the improved form of cable plow disclosed in the aforesaid Lawton Patent No. 2,099,527. Briefly, the latter device comprises two frame members or platforms, generally indicated at D and E, respectively, Figs. 2, 3 and 5 herein, operatively connected together by forward and after link arms 18, which coact to cause a plowshare 20, Figs. 3 and 5, to form a cable trench X that varies in depth as the ground resistance of the bed varies, thereby to maintain the towline tension within predetermined limits and to cause the cable to be embedded to a greater depth in those areas of the ocean bed comprising soft material than in the areas comprising denser material. Preferably, and as shown, the plowshare has wing members 20a on either side thereof to facilitate displacing the material forming the bed sufficiently to enable the cable to be laid in the bottom of the resulting trench. Rigidly secured to the frame member E are runners or skids 22 by means of which the cable embedding device is slid along on the bottom of the ocean.

Figure 3:
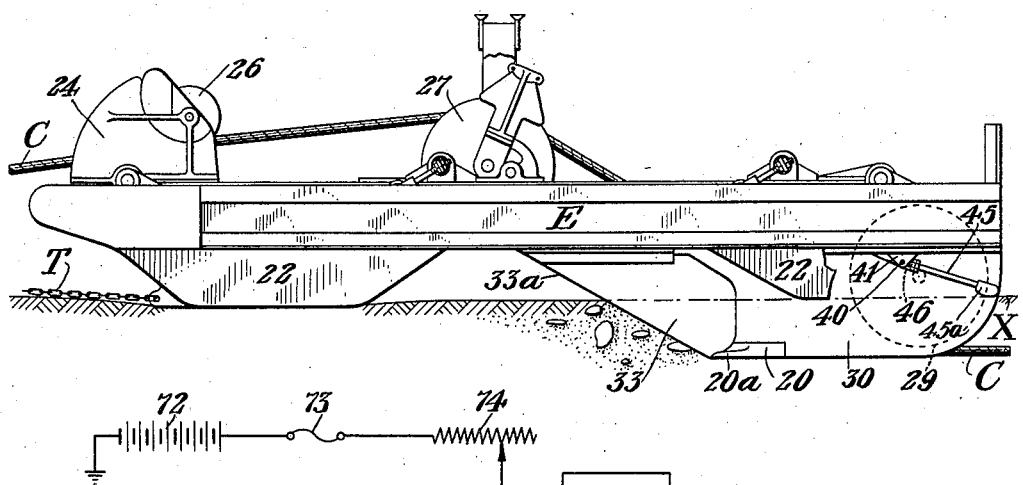
Fig. 3 is a side view of the apparatus of Fig. 2, shown in working position.

The frame member D carries a forward cable guide member 24 which permits the cable C easily to enter the guide and pass between the sheaves or rollers 25 and 26, over the roller 27, and through a truckway 28, Fig. 2, the cable being forcibly laid in the bottom of the trench X by means of a sheave or cable guide roller 29, the cable passing between two side plates 30, Figs. 3 and 5, in order that the material displaced by the plow will not slide or be washed back into the trench before the cable is laid therein. As set forth in detail in the aforesaid Lawton patent, the platform D in its lowermost position rests on the platform E, and retractile tension springs 32, Fig. 2, operatively connected to the platforms, are provided to oppose their separation. The plowshare 20 is rigidly secured to and depends from the platform D which is vertically movable with respect to platform E. When the ground resistance offered to the passage of the plowshare 20 builds up, a couple is created with the towing tension, tending to separate the two platforms D and E vertically. This causes the upper platform D to rise to different heights depending upon the density of the material forming the bed, and this causes a corresponding rise in the plowshare 20 carried by the platform D, thus decreasing the depth of the trench X as the dense material is encountered and causing the trench to vary in depth roughly inversely as the density of the material forming the surface of the bed of the body of water. Resisting the couple thus formed is the weight of the upper platform D and the tension exerted by the springs 32, and by proper design of the spring structure a balance can be obtained at any predetermined maximum towing tension at both extreme positions of the frames.

In order to prevent fouling of the plowshare 20 by obstructions, such as underlying rock formations and the like, which may be encountered in the ocean bed, a web portion 33, Fig. 3, is provided which extends between the plowshare and the platform D, the inclined forward edge 33a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Fixedly secured to plate 43, Figs. 2 and 5, of the platform D is a transmitting device 55 constructed in accordance with the present invention, this device being operable under water and adapted, in a manner hereinafter explained in detail, to transmit signals which give an indication on board ship of the depth of the cable trench being formed by the cable embedding device as it travels along on the bed of the body of water. In the embodiment illustrated herein, the electrical signals produced by this device are transmitted, by means of the signal or messenger cable M, Fig. 1, to the cable ship, the ship having receiving apparatus thereon responsive to the signals for indicating, and preferably recording, the depth of the trench at any instant during the cable laying operations.

When the plow is passing through relatively soft material the plowshare 20 is in approximately its lowermost position, and in this position forms a relatively deep trench. When the plow is passing through denser material, however, the platforms D and E are separated by reason of the increase in ground resistance, and the plow 20 is raised upwardly by the rise of the platform D to the position shown in Fig. 3.

Figs. 5 and 6 illustrate the various details of a preferred form of transmitting device, although any other suitable transmitting device may be employed. In the embodiment illustrated, the transmitter 55 is enclosed in a casing 81, which is filled with an insulating oil as indicated in Fig. 5, preferably castor oil of low acid content.

Because of the enormous hydrostatic pressures encountered in deep sea operations, the casing for the transmitter must be able to withstand very high pressures. The use of a very heavy container having the proper configuration, for example, cylindrical or spherical, does not solve the problem where a cable or conductor, such as the signal conductor 70, or where a shaft 54, or other operating member, enters the casing, since the hydrostatic pressure of the water will cause the casing to leak at the gland structure and packing in the stuffing box 60 around the shaft 54, providing the necessary freedom of movement of the shaft is present, notwithstanding various methods heretofore devised in an effort to prevent this. Also, the casing tends to leak around the gland and packing of the stuffing box 61 where the conductor 70 enters. Furthermore, the use of a very heavy casing is undesirable because of the considerable additional weight of such casings, and also because the configuration of such casings usually results in considerable lost space between the enclosed apparatus and the casing.

In the form of transmitter disclosed, bellows structure or equivalent, illustrated by the metal bellows members 80, is employed, the bellows structure being in communication with the interior of the casing 81, the members 81 having their inner open ends tightly screwed into the body of the casing from the outside, the outer bellows portions projecting from a side of the casing as shown in Fig. 5. The bellows preferably are protected by a false side 82 of steel plate, the plate being fitted to the container with sufficient clearance to permit the water to reach the bellows. The casing and bellows are filled with oil, and as hydrostatic pressure of the water is applied to the bellows, the latter are compressed to an extent such that the pressure on the oil within the casing, due to the compression of the bellows, increases sufficiently to oppose and counteract the hydrostatic pressure of the water, thus preventing collapse of the casing and preventing the entrance of water through the stuffing boxes 60 and 61. In a submarine device such as illustrated herein, the bellows are so constructed that at a depth of 500 fathoms in sea water all bellows members will be compressed about ¾ of the maximum permissible amount. In filling the casing with oil, it is necessary to take precautions against leaving air pockets.

By means of the equalization of pressure within and without the casing in the manner disclosed, the casing may be made of relatively thin, light weight material, and at a comparatively low cost, and may have any desired configuration. Furthermore, the pressure on the oil or other fluid within the bellows structure and casing will automatically increase or decrease as the hydrostatic pressure of the water on the outside of the casing increases or decreases, and only sufficient pressure is built up within the casing necessary to counteract the outside pressure regardless of the depth of the water in which the device is working, and therefore no undue stresses are imposed on the casing or the device within.

Referring again to Figs. 5 and 6 of the drawings, the transmitter 55 is securely mounted in any suitable manner, as by riveting or welding, to the plate member 43 of the platform D. In the illustrative embodiment disclosed, the transmitter comprises series connected resistance coils, diagrammatically shown at 76 in Fig. 4, from which taps are taken to rheostat segments or contacts engaged by a rheostat arm 77 which, in moving over the rheostat segments, varies the resistance in the signal circuit to transmit impulses or signals which indicate on board ship, in a manner hereinafter explained, the depth of the cable trench at any instant during the cable embedding operations. It will be understood, however, that any suitable form of rheostat or other means for controlling the flow of current in a signal circuit or otherwise producing electrical signals may be employed in lieu of the device shown.

Figure 4:
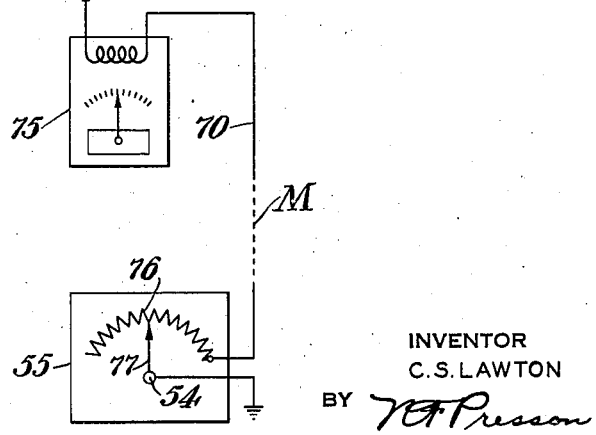
Fig. 4 is a schematic diagram of the signal circuit employed in Fig 1.

The position of the rheostat arm 77, Fig. 4, is controlled by a rotatable shaft 54, Figs. 5 and 6, which passes through the cover of the transmitter casing, a gasket 55a being provided to seal the transmitter casing and prevent escape of the oil. The position of the shaft 54 is controlled as follows:

A rod or pendulum 45, having a weighted portion 45a, is pivotally mounted at 46 to the lower bifurcated end of an arm 47 which passes through an opening in the plate 43, the pendulum tending to return to a vertical position under the influence of gravity. The arm 47 is pivotally mounted at 40 to a bracket 41 secured to a plate 42, the latter plate being secured to plate 43 of platform D. The upper end of arm 47 is pivotally connected to the lower end of a link 50, the upper end of link 50 being pivotally connected to a lever 51. The lever 51 is pivotally mounted to a bracket 57 secured to channel member 58 of platform D. The lower end of lever 51 is pivotally connected to a link 52, and link 52 is pivotally connected to an arm 53 which is keyed to the shaft 54 that controls the transmitter rheostat arm 77.

By means of the arrangement shown, the pendulum 45 may swing outwardly from the plow structure, i. e., in a plane generally parallel to the transverse axis of the cable plow (in the plane of the paper as viewed in Fig. 5) without necessarily affecting the position of the arm 47. Such movement of the pendulum 45 enables the same to swing outwardly from the plow structure to thereby avoid injury to the pendulum and lever system when the plow is lowered into working position on the bed of the ocean or other body of water, or when the plow resumes trench-forming operations after it has risen out of the bed and has temporarily ceased its plowing operation due to an obstruction encountered or other adverse condition. The pendulum 45 is also adapted to swing in a plane generally parallel to the longitudinal direction of movement of the plow, when the latter is working, and thus rotate the arm 47 in a counterclockwise direction, as viewed in Figs. 3 and 6, and this movement of the pendulum and arm causes the link system comprising the members 50 to 53 to rotate the transmitter rheostat shaft 54 a corresponding extent in a clockwise direction, this latter movement being shown in full line in Fig. 3 and indicated in dotted outline in Fig. 6.

During trench-forming operations, as will be seen from Fig. 3, the end 45a of the pendulum 45 engages and travels along on the ocean bed adjacent to the trench, and this angular displacement of the pendulum 45 from the vertical causes a corresponding displacement of the transmitter operating shaft 54 which, in turn, transmits a signal corresponding to the position of the member 45 at any instant and thus gives an indication of the depth of the trench being formed. In practice, the normal operating position of the lower end of pendulum 45 may be slightly higher than the surface of the bed of the body of water in which the cable is being embedded due to the material which is displaced at the side of the trench by the plow 20, but this condition can readily be taken into account and a correction made therefor, either by adjusting the constants of the signal circuit to correct the reading of the indicating and recording instrument, or by observing the reading of the indicating and recording instrument and making any necessary correction. The device disclosed enables an indication to be obtained on board ship as to the depth of the trench being formed at any instant, and also indicates whether the plow is working properly since, if the plow rises out of the bed, the pendulum will return to a vertical position, under the influence of gravity, to give an indication of this fact.

In the device disclosed herein, it is desirable that the shaft 54 and rheostat arm 77 register one and one-half degree angular movements in the region of the predetermined normal position shown on Fig. 4, and a stud type rheostat preferably is employed. The radius of the arc of contact had to be large for one and one-half degree studs to be practicable; on the other hand, a large radius involves a high friction torque and a large casing. Step-up gearing between the rheostat arm and its actuating shaft 54 was impracticable because of the effect which even a slight backlash and friction would have on the accuracy of the device. Since the normal pressure at the contact surfaces was to reach 1300 pounds per square inch, the coefficient of friction had to be as small as possible so that the desired accuracy could be obtained with a reasonable value of torque required. In the rheostat herein disclosed, the contact is made by two spring-pressed rollers carried by the rheostat arm 77, which rollers move over the two parallel rows of segments in the manner set forth in detail in my copending U. S. application, Ser. No. 189,971, filed February 11, 1938. The smallest segments of each row (which are on each side of the normal position as shown in Fig. 4) subtend an angle of three degrees at the shaft axis, and one row of segments is displaced with respect to the other. The two rollers above referred to alternately make contact with the segments of the two rows, and the effect is that of segments on one and one-half degree centers, while the radius of the contact circle is only approximately four inches in the embodiment illustrated. Preferably, the transmitter is arranged to give readings in steps of one and one-half degrees for fifteen degrees swing of the rheostat arm on either side of normal position, but beyond this the rheostat segments and the corresponding milliammeter deflections are enlarged.

The signaling circuit 70, shown diagrammatically on Fig. 4, is energized by a 110 volt battery or other source of direct current 72 on board ship, one side of the battery being grounded to the ship's hull and the other side connected through a fuse 73, and a ballast resistance 74 to the recording milliammeter 75, although it will be understood that any other suitable indicating or recording instrument may be employed. From the milliammeter the circuit continues through the conductor 70 and signal cable M, shown in Fig. 1, and at the plow the signal cable is secured in any suitable manner to the plow structure, and the cable lead or conductor 70 enters the transmitter 55 through the stuffing box 61 in the cover of the transmitter casing hereinbefore described. The conductor 70 comprising the signal circuit is connected, as shown in Fig. 4, to one end of the resistance element 76, and thence through the various sections of the resistance to the various rheostat segments. The return circuit is through the spring-pressed rollers, rheostat arm 77, and thence to the casing of the transmitter 55, the circuit being completed through the water to the vessel V to which the battery 72 is grounded.

The ballast resistance 74 on board the vessel preferably is of the tubular type and is continuously variable from zero to the necessary value, for example, 276 ohms, the resistance being provided to adjust the milliammeter deflection at the commencement of an operation and subsequently protecting the milliammeter in the event of a cable fault. The deflection adjustment should be made when the transmitter on the plow is in a known position, for instance, with the rheostat arm 77 in the midpoint position, to bring the milliammeter pointer to the corresponding midpoint scale position. Once set, the ballast resistance should remain unchanged until the length of messenger cable M in the signal circuit is changed. In the specific circuit disclosed in Fig. 4 of the drawings, the resistance in circuit between the ship's ground and the plow, including the resistance of the messenger cable but excluding the plow instrument, will be approximately 229 ohms. Since the messenger cable shown has a resistance of approximately 49 ohms per mile, there will be between 130 and 230 ohms in the ballast resistance, depending on the length of messenger cable in use. It will be appreciated, however, that the constants employed may vary within wide limits, depending upon various factors, such as the particular type of signal transmitter employed, the depth at which the submarine device is working, etc.

The recording milliammeter is of a type well known in the art, and therefore is not described here in detail. The useful part of the chart on the recording milliammeter may be 3¾ inches wide, and is divided into 50 parts each representing 10 milliamperes of current. The divisions are progressively smaller from the zero-current end of the scale to the maximum-current end, but the departure from linearity is slight. The indicator circuit has been so designed that the current will not fall below 20 milliamperes or rise above 480 milliamperes, unless a fault occurs in the messenger cable or elsewere.

It is essential that the supply of voltage 72 be maintained within a small margin on either side of 110 volts. The effect of a change of voltage on the milliammeter deflection varies with the deflection itself, and the apparatus has been so designed that the greatest effect occurs in lesser-used parts of the scale or where the degree of accuracy required is lowest.

In order to prevent fouling of the cable M by the plow or the cable C or towline T, buoy devices B are provided, as shown in Fig. 1, the buoy devices being connected to the cable at points so spaced from the cable laying device as to prevent fouling. Preferably, although not necessarily, the buoy devices are of the type disclosed and claimed in my aforesaid copending application, Ser. No. 189,971, filed February 11, 1938, in which each buoy device B comprises a plurality of small buoys or hollow steel balls, these small buoys being enclosed in a container of canvas or other suitable material. The small buoys are better adapted to withstand the enormous hydrostatic pressures encountered and yet retain a reasonable margin of buoyancy. Even when relatively small balls were used as buoys, nevertheless it was found these were likely to collapse in the event of a dent in them by adjacent balls, and therefore the individual buoys in each of the devices B are separated by shock absorbing means of felt or other suitable material. With the buoy device shown, eddy resistance and consequent vibrational stresses are reduced to a minimum and are not substantially greater than that encountered with a single ball.

The cable embedding device F may be lowered onto the bed of the ocean or other body of water by any suitable form of lowering line, such as shown in the aforesaid Lawton and Bloomer Patent No. 2,067,717 or the Lawton Patent No. 2,099,527. Because of the disposition of the center of gravity which is kept low in the device F and because of the substantial breadth of the device, the device will not turn over even though canted through a large angle with respect to the horizontal, and if the device should be canted on to its side its configuration and its low center of gravity tend to cause it to return to working position. The device is especially adapted for embedding a submarine cable in deep water and at considerable distances from shore, and may be lowered into working position out at sea in such areas. The various mechanical elements of the apparatus disclosed preferably are made from material resistant to the corrosive action of salt water.

In the specific embodiment disclosed, the device F, on which the transmitting unit 55 is mounted, is employed for embedding a submarine cable, but the invention is not limited to such a device, and may be utilized in various kinds of submarine apparatus and devices. Many other and varied forms and uses will readily suggest themselves to

I claim:

1. A submarine cable embedding device comprising means for forming under water a cable trench in the bed of the body of water in which the cable is to lie, said device having supporting means for traveling along on the bed of said body of water and having other means engaging said bed as the device travels along, said other means being movable to different operative positions depending upon the depth of the trench being formed, and means controlled by said other means for indicating the depth of the trench formed during the embedding operation.

2. A submarine cable embedding device comprising trench-forming means for forming under water a cable trench in the bed of the body of water in which the cable is to lie, said device having supporting means for traveling along on the bed of said body of water, means operable in accordance with the ground resistance offered to the passage of said trench-forming means through the bed for adjusting the position of the trench-forming means relative to the supporting means to vary the depth of the trench as said ground resistance varies, said embedding device having means engaging said bed as the device travels along, said last named means being movable to different operative positions in accordance with the varying depth of the trench being formed, and means controlled by said last named means for indicating the varying depth of the trench formed during the embedding operation.

3. A submarine cable embedding device comprising trench-forming means for forming under water a cable trench in the bed of the body of water in which the cable is to lie, said device having supporting means for traveling along on the bed of said body of water, said device having means engaging said bed at a place adjacent to one side of the trench formed as the device travels along, said last named means being movable to different operative positions depending upon the depth of the trench being formed, and means controlled by said last named means for indicating the depth of the trench formed at any instant during the embedding operation.

4. A submarine cable embedding device comprising trench-forming means for forming under water a cable trench in the bed of the body of water in which the cable is to lie, said device having supporting means for traveling along on said bed, said device having a turnably mounted member in engagement with said bed as the device travels along, said member being turnable to different operative positions depending upon the depth of the trench being formed, and means controlled by said turnable member for indicating the depth of the trench formed during the embedding operation.

5. A submarine cable embedding device comprising trench-forming means for forming under water a cable trench in the bed of the body of water in which the cable is to lie, said device having supporting means for traveling along on the bed of said body of water, said device also having a weighted member engaging said bed as the device travels along, said weighted member being movable under the influence of gravity to different operative positions depending upon the depth of the trench being formed, and means controlled by said weighted member for indicating the depth of the trench formed during the embedding operation.

6. A submarine cable embedding device comprising a plow for forming under water a cable trench in the bed of the body of water in which the cable is to lie, said device having plow-supporting means for traveling along on the bed of said body of water, and a member carried by said device for engaging said bed as the plow travels through the bed, said member being movable to different operative positions depending upon the depth to which the plow is working at any instant during the embedding operation, and means controlled by said movable member for indicating at a distance from said device the depth of the trench being formed by the plow during the embedding operation.

7. A submarine cable embedding device comprising trench-forming means for forming under water a trench in the bed of the body of water in which the cable is to lie, said device having supporting means for traveling along on the bed of said body of water, the depth of said trench varying in accordance with the nature of the ground encountered by the trench-forming means, said device having means engaging said bed and operable under the water for transmitting signals corresponding to different positions assumed by the trench-forming means relative to the surface of the bed, and receiving means located at a distance from the transmitting means and responsive to said signals to indicate the various positions of the trench-forming means and thereby indicate the varying depth of the trench formed by the trench-forming means.

8. A submarine cable embedding device comprising trench-forming means for forming under water a trench in the bed of the body of water in which the cable is to lie, means on said device to enable the same to travel along on the bed of said body of water, means for towing the device along on said bed, means operable in accordance with the towing tension for vertically adjusting the position of the trench-forming means to vary the depth of the trench as the towing tension varies, said device also having means engaging said bed and operable under the water for transmitting signals in accordance with the vertical positions assumed by the trench-forming means as the towing tension varies, and receiving means located at a distance from the transmitting means and responsive to said signals to indicate the various vertical positions of the trench-forming means and thereby indicate the varying depth of the trench formed by the trench-forming means.

9. Submarine cable embedding apparatus comprising a device and means for causing the device to travel along on the bed of the ocean or other body of water, means on said device for forming a cable trench in said bed, said device having a transmitter and a feeler member normally engaging and traveling along on the bed, a signal circuit operatively associated with the transmitter, a source of signal current for said circuit, said transmitter having means including a rheostat automatically operable by the motion of said feeler member for varying the flow of current in the signal circuit in accordance with the varying depth of the trench formed by the device as it travels along on said bed, a receiver located at a distance from the transmitter and operatively associated with said signal circuit, said receiver having means responsive to the varying signal current to indicate the depth of the trench formed at any instant by said device, and means enclosing said rheostat adapted to withstand the hydrostatic pressure of the water and prevent the entrance of water to the rheostat.

10. Submarine cable embedding apparatus comprising a device and means for causing the device to travel along on the bed of the ocean or other body of water, means on said device for forming a cable trench in said bed, said device having a transmitter and a weighted member having the lower end thereof normally engaging and traveling along on the bed and movable to different positions corresponding to the depth of the cable trench, a signal circuit operatively associated with the transmitter, a source of signal current for said circuit, said transmitter comprising contact means controlled by said weighted member for varying the flow of current in the signal circuit in accordance with the movement of the weighted member as it travels along on said bed, a receiver located at a distance from the transmitter and operatively associated with said signal circuit, said receiver having means responsive to the varying signal current to indicate the various positions assumed by said weighted member, and means enclosing said contact means adapted to withstand the hydrostatic pressure of the water and prevent the entrance of water to the contact means.

CHESTER S. LAWTON.